United States Patent
Liu et al.

(10) Patent No.: US 9,930,626 B2
(45) Date of Patent: Mar. 27, 2018

(54) DEVICE, NETWORK, AND METHOD FOR COMMUNICATIONS WITH DYNAMIC ADAPTATION

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 138 days.

(21) Appl. No.: 14/708,086

(22) Filed: May 8, 2015

(65) Prior Publication Data

US 2015/0327233 A1    Nov. 12, 2015

Related U.S. Application Data

(60) Provisional application No. 61/991,296, filed on May 9, 2014.

(51) Int. Cl.
| | |
|---|---|
| *H04W 4/00* | (2009.01) |
| *H04W 56/00* | (2009.01) |
| *H04W 72/04* | (2009.01) |
| *H04W 76/02* | (2009.01) |
| *H04L 5/00* | (2006.01) |

(52) U.S. Cl.
CPC ........... *H04W 56/00* (2013.01); *H04L 5/0098* (2013.01); *H04W 56/0015* (2013.01); *H04W 72/0406* (2013.01); *H04W 76/025* (2013.01); *H04L 5/001* (2013.01); *H04L 5/0051* (2013.01); *Y02B 60/50* (2013.01)

(58) Field of Classification Search
CPC ..... H04L 5/001; H04L 5/0051; H04L 5/0098; H04W 56/00
See application file for complete search history.

(56) References Cited

U.S. PATENT DOCUMENTS

| | | | | |
|---|---|---|---|---|
| 9,497,763 | B2* | 11/2016 | Feuersaenger | H04L 5/001 |
| 2007/0155386 | A1* | 7/2007 | Wahl | H04L 29/06027 455/436 |
| 2009/0110034 | A1 | 4/2009 | Kowalski | |
| 2009/0257387 | A1 | 10/2009 | Gholmieh et al. | |
| 2010/0118771 | A1* | 5/2010 | Lee | H04W 36/005 370/328 |
| 2011/0267978 | A1* | 11/2011 | Etemad | H04L 5/003 370/254 |
| 2011/0268028 | A1* | 11/2011 | Stern-Berkowitz | H04L 5/0048 370/328 |

(Continued)

OTHER PUBLICATIONS

International Search Report and Written Opinion for Application No. PCT/US2015030033 dated Sep. 30, 2015, 11 pages.

*Primary Examiner* — Asad Nawaz
*Assistant Examiner* — Berhanu Belete
(74) *Attorney, Agent, or Firm* — Slater Matsil, LLP

(57) ABSTRACT

An embodiment communication system and method adaptively use a secondary cell under the control of a primary cell for communicating with a user device. The secondary cell and the user device communicate based on instructions provided to both by the primary cell. To reduce interference and minimize power usage, the communications channel for the secondary cell is normally off.

32 Claims, 10 Drawing Sheets

(56) References Cited

U.S. PATENT DOCUMENTS

| | | | |
|---|---|---|---|
| 2011/0269490 A1* | 11/2011 | Earnshaw | H04L 1/0026 |
| | | | 455/509 |
| 2012/0250520 A1 | 10/2012 | Chen et al. | |
| 2012/0300743 A1* | 11/2012 | Kim | H04L 5/0091 |
| | | | 370/329 |
| 2013/0010641 A1* | 1/2013 | Dinan | H04W 36/0072 |
| | | | 370/254 |
| 2013/0012186 A1* | 1/2013 | Kim | H04L 5/003 |
| | | | 455/418 |
| 2013/0039202 A1* | 2/2013 | Feuersanger | H04L 5/001 |
| | | | 370/252 |
| 2014/0003269 A1* | 1/2014 | von Golitschek | H04L 5/003 |
| | | | 370/252 |
| 2015/0181492 A1* | 6/2015 | Schmidt | H04W 36/30 |
| | | | 455/443 |
| 2016/0205681 A1* | 7/2016 | Kim | H04B 7/2656 |
| | | | 370/329 |
| 2016/0294531 A1* | 10/2016 | Loehr | H04W 72/0413 |

\* cited by examiner

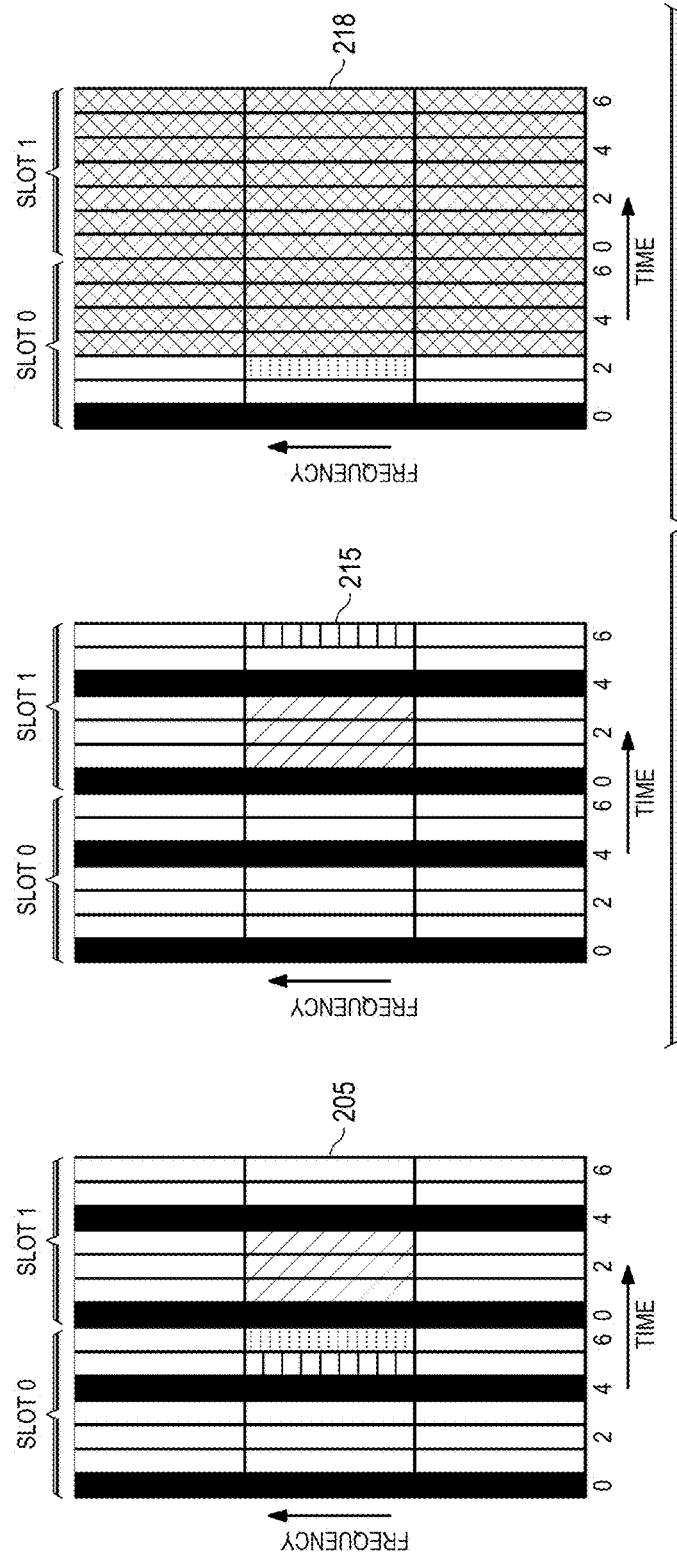

DEVICE, NETWORK, AND METHOD FOR COMMUNICATIONS WITH DYNAMIC ADAPTATION

This application claims the benefit of U.S. Provisional Application No. 61/991,296, filed on May 9, 2014, entitled "Device, Network, and Method for Communications with Dynamic Adaptation," which application is hereby incorporated herein by reference

TECHNICAL FIELD

The present disclosure relates to a device, network, and method for wireless communications, and, in particular embodiments, to a device, network, and method for communications with dynamic adaptation.

BACKGROUND

The amount of wireless data being transferred is expected to exceed that of wired data, pushing the limits of macro cellular deployment. Small cell deployment with higher density and/or with new and diversified spectrum resources may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells. Small cells may be densely deployed and may also utilize additional spectrum resources, such as unlicensed spectrum resources.

SUMMARY

Embodiments herein include a communication system having a first communications controller configured to provide a first communications channel and a second communications controller configured to provide a second communications channel. The second communications controller is configured to provide the second communications channel in response to a first trigger command that the first communications controller provides when the first communications controller sends a second trigger command on the first communications channel to a user device commanding the user device to communicate using the second communications channel. The first communications controller may be a cell site and the second communications controller may be a cell site, femtocell, picocell, microcell or WiFi networks.

Another embodiment includes a mobile terminal in a wireless communication system. The mobile terminal includes a transceiver configured to communicate with a first communications controller using a first communications channel and configured to communicate with a second communications controller using a second communications channel. The mobile terminal only communicates using the second channel in response to receiving a first trigger command from the first communications controller.

Another embodiment includes a communication method. A first instruction is transmitted from a first communications controller to a second communications controller instructing the second controller to provide a communications channel. A second instruction is transmitted from the first communications controller to a user device commanding the user device to communicate using the communications channel.

BRIEF DESCRIPTION OF THE DRAWINGS

For a more complete understanding of the present invention, and the advantages thereof, reference is now made to the following descriptions taken in conjunction with the accompanying drawing, in which:

FIG. 2B illustrates an example frame structure for a frequency division duplexing (FDD) configuration and a time division duplexing (TDD) configuration;

FIG. 2C illustrates an example OFDM subframe for FDD configuration;

FIG. 2D illustrates an example OFDM subframe for TDD configuration;

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UEs), wireless devices, user devices, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1A:
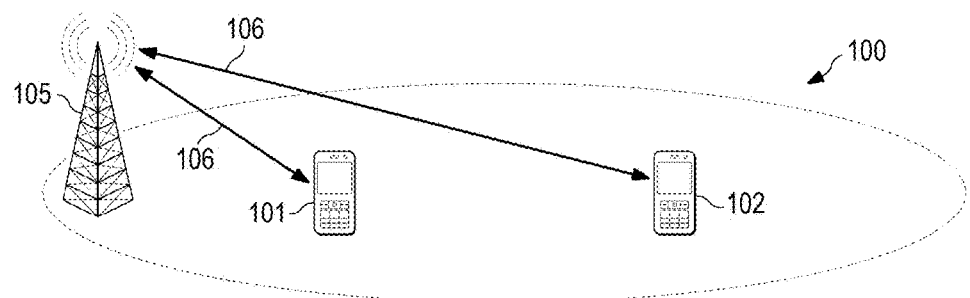
FIG. 1A illustrates cellular communications in a macro cell.

As shown in FIG. 1A, system 100 is a typical wireless network with a communications controller 105 communicating using a wireless link 106 to a first wireless device 101 and a second wireless device 102 (UEs). The wireless link 106 can includes a single carrier frequency such as used typically for a time division duplex (TDD) configuration or a pair of carrier frequencies as used in a frequency division duplex (FDD) configuration. Not shown in system 100 are some of the network elements used to support the communications controller 105 such as a backhaul, management entities, etc. According to convention, the transmission/reception from controller 105 to a UE is a downlink (DL) transmission/reception, and the transmission/reception from a UE to a controller 105 is an uplink (UL) transmission/reception.

Figure 1B:
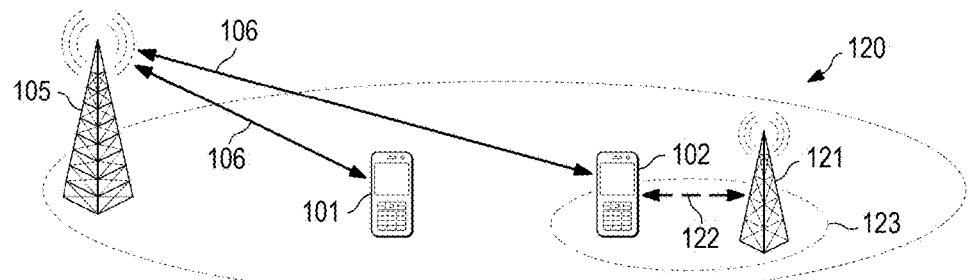
FIG. 1B illustrates cellular communications in a heterogeneous network with a macro cell and a pico cell.

As shown in FIG. 1B, system 120 is an example wireless heterogeneous network (HetNet) with communications controller 105 communicating to wireless device 101 using wireless link 106 (solid line) and to wireless device 102 using wireless link 106. A second communications controller 121, such as a pico cell, has a coverage area 123 and is capable of communicating to wireless device 102 using wireless link 122. Typically, wireless link 122 and wireless link 106 use the same carrier frequency, but wireless link 122 and wireless link 106 can use different frequencies. There may be a backhaul link (not shown) connecting communications controller 105 and communications controller 121, in some examples. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units (RRUs), distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces.

In a realistic network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In a realistic network, the points configured for a UE for transmission or reception may include multiple points, some pairs of points may have fast backhaul, but some other pairs of points may have slow backhaul or any backhaul.

In a realistic deployment, an eNodeB may control one or more cells. Multiple remote radio units may be connected to the same base band unit of the eNodeB by fiber cable, and the latency between the base band unit and the remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered to be promising as a way to cope with mobile traffic explosion, especially for hotspot deployments in indoor and outdoor scenarios. A low-power node generally means a node whose transmission power is lower than macro node and BS classes. For example, Pico and Femto eNB are both applicable low-power nodes. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
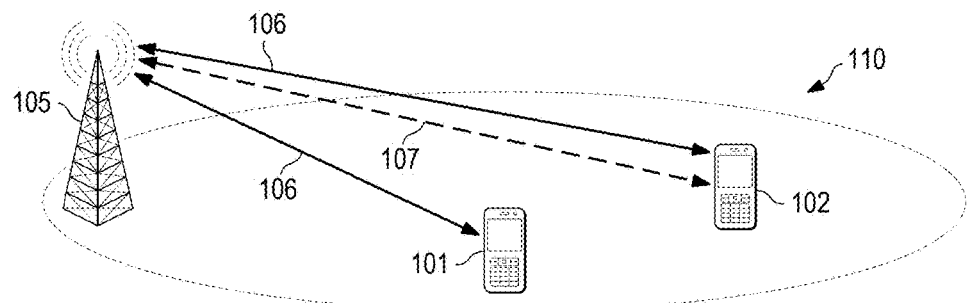
FIG. 1C illustrates cellular communications in a macro cell with carrier aggregation.

As shown in FIG. 1C, system 110 is a typical wireless network configured with carrier aggregation (CA) where communications controller 105 communicates to wireless device 101 using wireless link 106 (solid line) and to wireless device 102 using wireless link 107 (dashed line) and wireless link 106. In some example deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells may be implemented because a single scheduler in the same eNodeB may be able to schedule the multiple cells. With CA, one eNB may operate and control several component carriers forming primary cell (Pcell) and a secondary cell (Scell). In Rel-11 design, an eNodeB may control both a Macro cell and a Pico cell. In this case, the backhaul between the Macro cell and the Pico cell is fast backhaul. The eNodeB can dynamically control the transmission/reception of both the macro cell and the Pico cell.

Figure 1D:
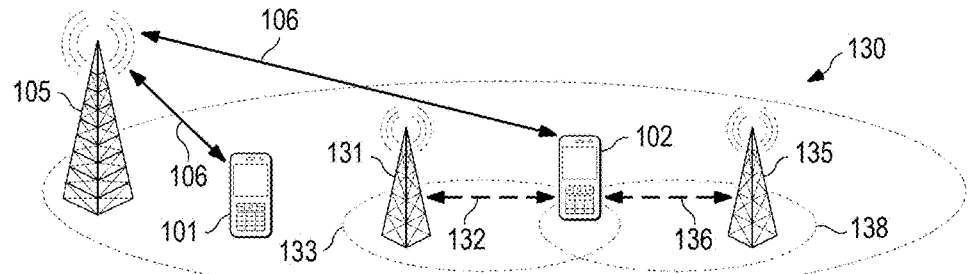
FIG. 1D illustrates cellular communications in a heterogeneous network with a macro cell and several small cells.

As shown in FIG. 1D, system 130 is an example wireless heterogeneous network with communications controller 105 communicating with the wireless device 101 using wireless link 106 (solid line) and to wireless device 102 using wireless link 106. A second communications controller 131, such as a small cell, has a coverage area 133 and is capable of communicating with the wireless device 102 using wireless link 132. A communications controller for another small cell 135 has coverage area 138 and uses wireless link 136. Communications controller 135 is capable of communicating to wireless device 102 using wireless link 136. Coverage areas 133 and 138 may overlap. The carrier frequencies for wireless links 106, 132, and 136 may be the same or may be different.

Figure 1E:
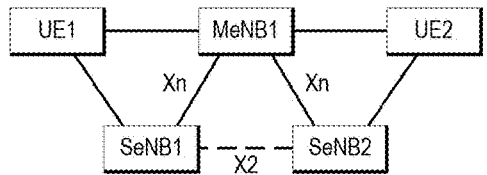
FIG. 1E illustrates an example dual connectivity scenario.

FIG. 1E shows an example system configured for dual connectivity. A master eNB (MeNB) is connected to one or more secondary eNBs (SeNBs) using an interface such as the Xn interface (Xn can be X2 in some specific cases) as a backhaul link. The backhaul can support this interface. Between the SeNBs, there may be an X2 interface. A UE, such as UE1, can connect wirelessly to MeNB1 and SeNB1. A second UE, UE2, can connect wirelessly to MeNB1 and SeNB2.

In orthogonal frequency-division multiplexing (OFDM) systems, the frequency bandwidth is divided into multiple subcarriers in the frequency domain. In the time domain, one subframe is divided into multiple OFDM symbols. Each OFDM symbol may have a cyclic prefix to avoid inter-symbol interference due to multiple path delays. One resource element (RE) is defined by the time-frequency resource within one subcarrier and one OFDM symbol. A reference signal and other signals, such as a data channel, e.g. a physical downlink shared channel (PDSCH), and a control channel, e.g. a physical downlink control channel (PDCCH), are orthogonal and multiplexed in different resource elements in the time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid inter-symbol interference.

Figure 2A:
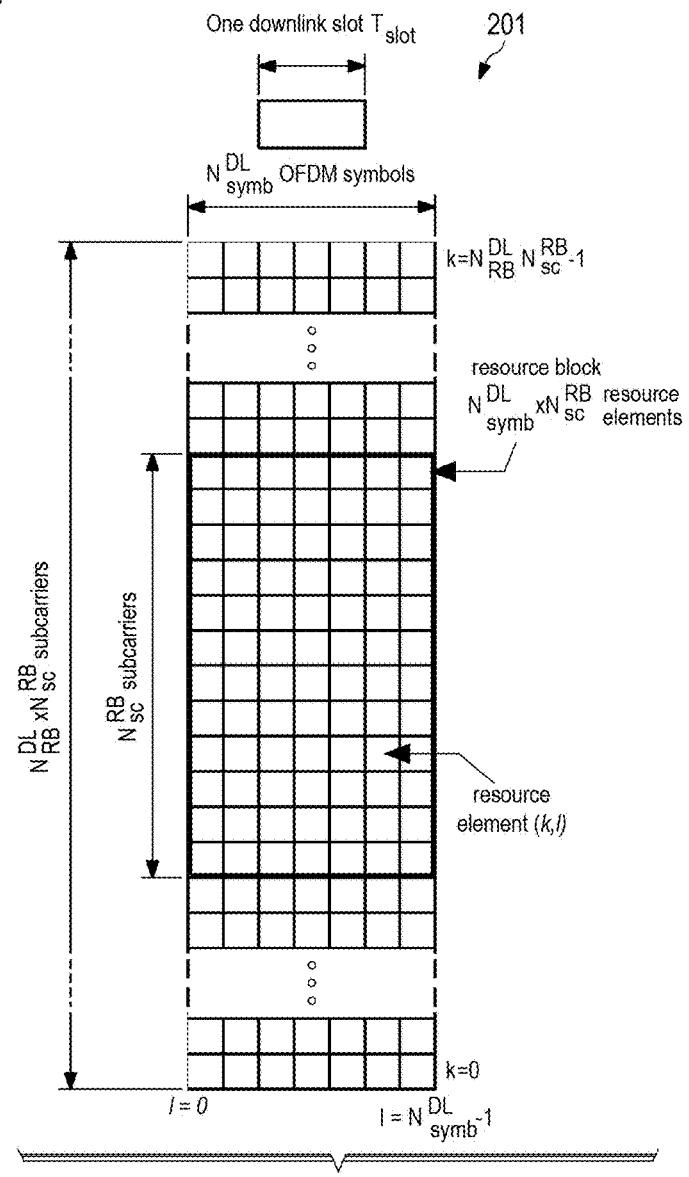
FIG. 2A illustrates example orthogonal frequency division multiplexing (OFDM) symbols with normal cyclic prefix (CP)

Each resource block (RB) contains a number of REs. FIG. 2A illustrates example OFDM symbols with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In FIG. 2A, only one slot 201 of a subframe is shown. There are 12 subcarriers in each RB, and hence in this example, there are 12×14=168 REs in a RB pair (an RB is 12 subcarriers by the number of symbols in a slot). In each subframe, there are a number of RBs, and the number may depend on the bandwidth (BW).

FIG. 2B shows two frame configurations used in LTE. Frame 200 is typically used for a FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The shading used in frame 210 is exemplary but is based on the standards TSG 36.211 Rel. 11.

FIG. 2C and FIG. 2D show examples of downlink subframes that are partitioned in terms of symbols and frequency. A subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an example of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal hatching shows the location of the secondary synchronization signal (SSS). The adjacent dotted shading shows the location of the primary synchronization signal (PSS). Both the PSS and SSS occupy the center six resource blocks of the downlink carrier. The diagonal lines in symbols 0, 1, 2, 3 of slot 1 represent the location where the physical broadcast channel (PBCH) occupies for subframe 0. The PBCH is not transmitted in subframe 5 in Rel. 11 of the standards. Note, the PSS, SSS, and CRS can be viewed as overhead.

In FIG. 2D, subframe 215 shows an example of the symbol allocation for subframes 0 and 5 of TDD subframe 210 in FIG. 2B. Likewise, subframe 218 shows an example of the symbol allocation for subframes 1 and 6 of TDD subframe 210. In both subframe 215 and subframe 218, the solid shading shows the symbols having the CRS. The example also assumes either CRS is transmitted on antenna port 0 or on antenna ports 0 and 1. The horizontal shading in subframe 215 shows the location of the SSS. The dotted shading in subframe 218 shows the location of the PSS. Both the PSS and SSS occupy the center six RBs of the downlink carrier. The cross shading in subframe 218 indicates that the remaining symbols of the subframe are either downlink (if subframe 6 is a downlink subframe) or a combination of downlink symbols, guard time, and uplink symbols if the subframe is a special subframe. Similarly to FIG. 2C, the diagonal lines in symbols 0, 1, 2, 3 of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
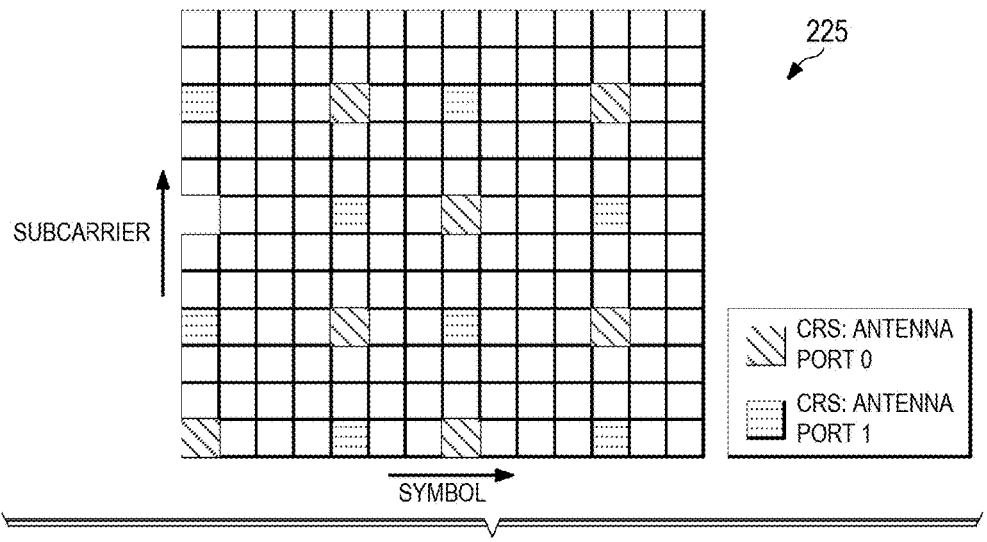
FIG. 2E illustrates an example common reference signal (CRS)

In downlink transmission of the LTE-A system, there is a reference signal for the UE to perform channel estimation for demodulation of PDCCH and other common channels as well as for measurement and some feedbacks, which CRS inherited from the Rel-8/9 specification of E-UTRA, as shown block 225 in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2F:
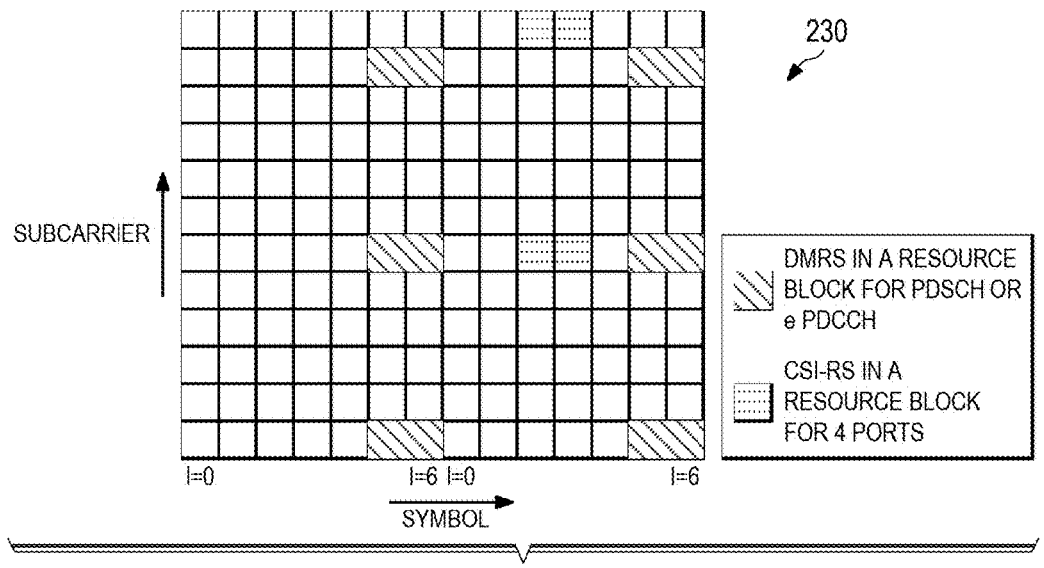
FIG. 2F illustrates an example channel status indicator reference signal (CSI-RS) and dedicated/de-modulation reference signal (DMRS)

In Rel-10, channel status indicator reference signal (CSI-RS) is introduced in addition to CRS and DMRS, as shown block 230 in FIG. 2F. CSI-RS is used for Rel-10 UEs to measure the channel status, especially for multiple antenna cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is a specific time-frequency resource and scrambling code assigned by the eNB for each CSI-RS resource.

Figure 2G:
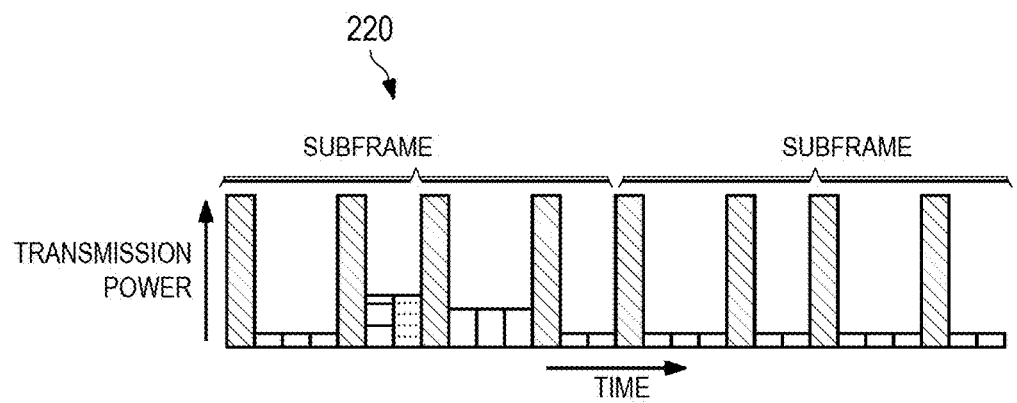
FIG. 2G illustrates an example of transmission power.

FIG. 2G shows an exemplary plot 220 of the transmission power from a communications controller, such as 105 in FIG. 1A, for an FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B, even when communications controller 121 is not serving a UE, such as wireless device 102. This interference can reduce the system capacity.

However, eliminating these signals entirely can impair system operation. For example, a wireless device relies on these signals to synchronize (both time and frequency) and then make measurements. One example of a wireless device using these signals is presented in the flowchart 300 in FIG. 3. The wireless device (UE) first detects the transmitted PSS in step 305. The UE can then detect the SSS in step 310. Having both the PSS and SSS provides the UE information such as: 1) frame configuration (FDD or TDD); 2) cyclic prefix used for certain downlink subframes; 3) the cell ID; and 4) the location of subframe 0. In addition, the UE can perform coarse frequency and timing synchronization using the PSS and SSS.

Since the UE knows the cell id, cyclic prefix, and location of subframe 0, the UE can make measurements on the CRS in subframes 0 and 5 as shown in step 315. Example measurements may comprise the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the UE may choose to process the PBCH to determine other information such as the number of antenna ports over which the CRS is transmitted, the frame numbering (e.g., 0 to 1023, for example), and the downlink bandwidth (bandwidth of the downlink carrier) as shown in step 320.

Figure 3:
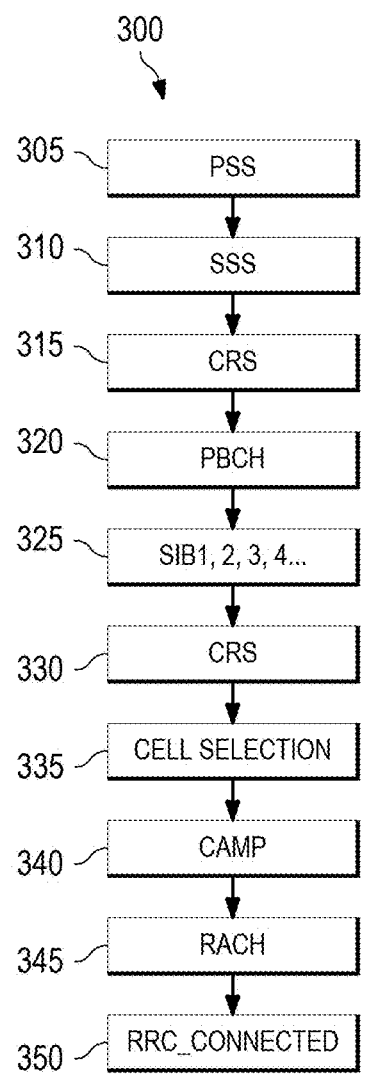
FIG. 3 illustrates an example of a wireless device performing synchronization and measurement using reference signals.

The remaining steps in FIG. 3 show how the UE can become assigned to an eNB. In step 325, the UE listens to system information broadcast (SIB) messages, such as SIB1, SIB2, etc. To listen to SIB messages, the UE typically receives the PDCCH to process the downlink control information (DCI) to obtain the modulation, coding, etc. information for the PDSCH carrying the SIB message. In step 330, the UE may process more CRS for measurement purposes. In step 335, the UE may compare cells in one or more carriers and select a suitable one. In step 340, the UE may decide to camp on the selected carrier. In step 345, the UE may begin the random access procedure by transmitting the random access channel (RACH) on the uplink in order to enter the RRC_CONNECTED state in step 350. There may be a message exchange in step 350 between the UE and eNB. UEs have two states: RRC_CONNECTED and RRC_IDLE; the term "connected" can represent RRC_CONNECTED while "idle" can represent "RRC_IDLE.

One concept to reduce the interference from eNBs without any UEs attached (assigned, camped) is to turn those eNBs off. When UEs arrive, the eNBs would then turn on. Likewise, when there is no traffic, the eNBs could turn off. However, there are many modifications to the standards in order to support the on-off mechanism (on/off adaptation). For example, in current standards, the UE identifies the quality of an eNB based on the persistent transmission of signals such as the PSS, SSS, and CRS. When those signals are absent, the UE cannot measure the quality. Other questions regarding small cell on/off adaptation, or more generally, network adaptation, include:
1. Coverage issue: ensuring cellular coverage despite small cell on/off actions;
2. Idle UE issue: can a small cell operating on and off support UEs in the idle state? What needs to be done to support idle UEs? In the connected state can the UE/eNB exchange data?
3. Legacy UE support (how to support UEs that do not have this feature);
4. How may fast on/off adaptation be supported? More specifically, how may fast on/off adaptation be supported, given newly introduced procedures/mechanisms (in Rel-11/12 or even beyond), such as small cell discovery and measurement enhancements; dual connectivity or more broadly, multi-stream aggregation (MSA); CoMP and enhanced CoMP (eCoMP) (including CoMP Scenario 4 (a network with low power RRHs within the macro cell coverage where the transmission/reception points created by the RRHs have the same cell IDs as the macro cell), coordination over non-ideal backhaul); massive carrier aggregation, etc.?

A small cell that is operating with on/off adaptation or power adaptation frequently (e.g., in time scale shorter than hours) may not be suitable to support idle UEs because rapid adaptation can cause an idle UE to enter cell reselection frequently and consume power. Similarly, they may not be suitable for coverage support that a macro cell can provide. Such a small cell may be mainly used to support the high traffic demand of active UEs, in addition to the basic functionalities provided by the coverage layer. The cells on the coverage layer may not perform on/off adaptation (at least they should not do so frequently). Idle UEs may be connected to coverage layer cells only. A consequence of this is that small cells do not have to be standalone cells at least from the perspective of legacy UEs. In certain isolated local areas, however, some scenarios may exist where coverage is not a concern and high capacity is desirable. In such cases, standalone small cells operating on/off may be deployed.

Therefore, typical deployment scenarios include a coverage layer whose cells do not perform network adaptation (or at least not too frequently or significantly), and a capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One example is cell 121 as shown in FIG. 1B.

In an embodiment, as one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

The mechanism of dynamic on/off of a small cell is seen as more beneficial when further evolution of small cell networks is envisioned. Specifically, densification of a small cell network has been proposed to handle the ever increasing needs in data capacity, while meeting customer quality of service expectations and operators' requirements for cost-effective service delivery. Roughly speaking, doubling the density of the small cell network can yield doubling of the capacity of the network. However, densification leads to higher interference, especially the interference caused by common channels (e.g. CRS) which are persistently transmitted. Turning off the small cell opportunistically can significantly help reduce interference and improve efficiency of the dense network.

Another way to increase the network resources is to utilize more and more usable spectrum resources, which include not only the licensed spectrum resources of the same type as the macro cell, but also the licensed spectrum resources of different type as the macro cells (e.g., the macro is a FDD cell but a small cell may use both FDD and TDD carriers), as well as unlicensed spectrum resources and shared spectrums. The unlicensed spectrums can be used by generally any user, subject to regulation requirements. Traditionally the unlicensed spectrums are not used by cellular networks as it is generally difficult to ensure quality of service (QoS) requirements. Operating on the unlicensed spectrums mainly include wireless local area networks (WLAN), e.g. the Wi-Fi networks. Because licensed spectrum is generally scarce and expensive, utilizing the unlicensed spectrum by the cellular operator may be considered. To meet the regulatory requirements of operating in the unlicensed spectrum and co-existing with other radio access technologies (RATs) such as Wi-Fi, the transmissions on the unlicensed spectrum cannot be continuous or persistent. Rather, on-demand on/off or opportunistic transmissions and measurements may be adopted.

Thus, it can be seen that when considering further evolution of the small cell networks, the main scenarios may be small cell networks with abundant resources in both node-density dimension and spectrum dimension. Such scenarios may be called hot areas, which indicate enlarged areas as compared to hot spots. Such hot areas are generally deployed and controlled by the network operators. For such hot areas, discontinuous, opportunistic, or on-demand transmissions (and reception) and measurements (of signals and/or various types of interference) on flexibly selected resources are needed.

An embodiment provides a framework of methods/designs suitable for hot areas, which may allow for operations in licensed and/or unlicensed spectrum. That is, the designs may be spectrum agnostic. The spectrum agnostic designs have certain advantages. If, instead, the main design framework is to customize the designs for different spectrums, then separate designs will definitely occur and they will grow further and further apart as time goes, making the specifications, implementation, and operation more complex. Therefore, it is preferred to have a unified framework over two or more separate frameworks for licensed and unlicensed. The unified framework is also feasible, since the main issues and hence main features for dense cellular operations and unlicensed LTE (U-LTE) operations share many commonalities, such as interference issues, non-existence of persistent DL RS (e.g. CRS), etc. In essence, a communication system may be boiled down into several building blocks for features/functionalities, e.g., measurements, access schemes, link adaptation, etc. Each can be further boiled down into smaller blocks. At a lower level, the operations for licensed and unlicensed are similar. Once these blocks are well defined, configuration signaling can be used to specify how the interconnected system may work in different types of spectrums. If certain branching-off is needed, it can be at suitable levels and the branches can be selected by network configuration signaling.

The desirable high-level features include adaptation, intra-RAT coordination, and inter-RAT co-existence. More specifically, they may be realized by means of load balancing/shifting, power control/adaptation, other interference coordination/avoidance such as probing. To enable these high-level features, the following embodiments may be adopted.

An embodiment method is adaptive resource selection. In other words, the network may adaptively select a subset of cell and/or carrier resources to be used for a UE. As there are more node resources and spectrum resources to be included in the network, from the UE perspective, it can discover multiple "cells" (a licensed component carrier, or CC, is generally viewed as a cell according to carrier aggregation; other nodes or carriers may be viewed as virtual cells or generalized cells with virtual cell IDs which may or may not be related to physical cell IDs). These cells may be configured for the UE (in slow time scale, for example), but not all will be used. The network selects a subset of the cells and signals to the UE (e.g., via RRC or MAC signaling, or via physical layer signaling for fast response). If a cell is not selected for any UE, it may be turned off and transmit only in a discovery burst (discovery RS burst, or DRS burst). If a cell is selected, the cell has to be on or turned on. The transition time is desirable to be as short as possible. In one embodiment, the bandwidth of a cell is not predetermined, but determined when it is selected for use or determined on the fly of the transmissions. For example, the cell and/or the UE may sense the usage of the spectrum and then decide on a portion of the spectrum which is less occupied.

An embodiment provides methods for adaptive transmission and reception. On the selected resources, discontinuous, opportunistic, and on-demand transmissions and receptions may occur. To enable such transmissions, embodiments of link adaptation, hybrid automatic repeat request (HARQ), timing advance, power control, etc., are provided.

An embodiment provides methods for measurements and reporting on demand. The measurements include signal measurements and measurements of various types of interference. Without persistently transmitted CRS and to support opportunistic transmissions, the measurement mechanisms, discovery, and synchronization are redesigned. Various types of interference measurement resources (IMRs) or interference sensing resources may need to be configured, with different types of IMRs suitable for different types of interference, such as intra-system (within the network controlled by the same cellular operator) interference, intra-RAT (for networks controlled by different cellular operators) interference, inter-RAT (e.g., between U-LTE and Wi-Fi), and so on.

Figure 4:
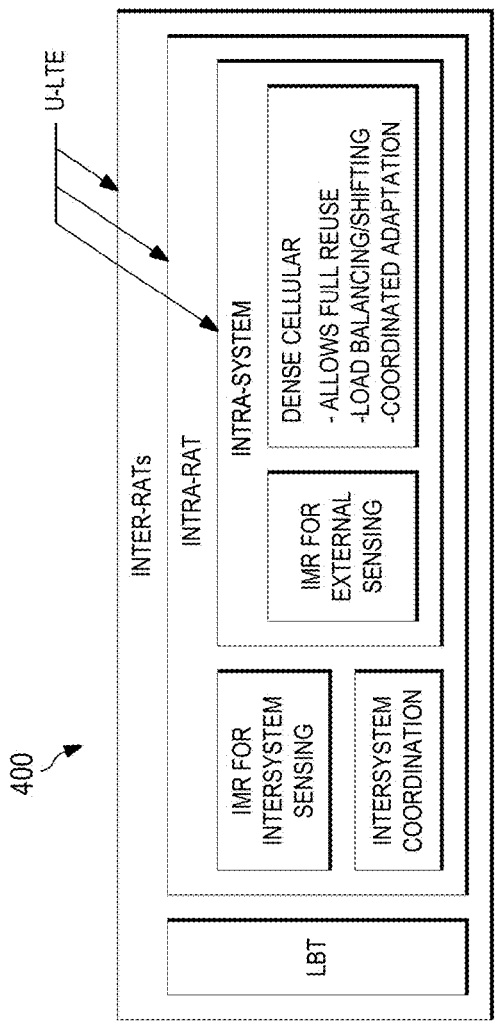
FIG. 4 illustrates an inclusion/specialization relationship of embodiment designs in different scenarios.

An embodiment framework 400 can be used for different scenarios, as shown in FIG. 4, which illustrates that the design features for one scenario may be a subset of another scenario. If all the features are included and designed for a network, then the network may adjust its configuration for the scenario, by selecting and combining included features, tweaking the parameters, etc. It can be seen that the core features are those designed for dense cellular, which are more advantageous than Wi-Fi designs under heavy traffic load and should be preserved for U-LTE if possible. When U-LTE is used, within the same system (i.e. intra-system) controlled by an operator, the main additional feature is an embodiment that includes a method of sensing external interference (i.e. non-U-LTE interference, mainly Wi-Fi interference) based on new designs of IMR. For the intra-RAT case, all features in the intra-system case can be used for intra-system operations, with the additional IMR for inter-system sensing, and, based on the sensing/measurement results, inter-system coordination in a generally slow or semi-static time scale may be performed. In the inter-RAT case, with the co-existence of U-LTE and Wi-Fi, all features in the intra-RAT case can be used for intra-RAT operations, and the additional feature is to support listen-before-transmission (or listen-before-talk, LBT). Not all dense cellular features can be used for inter-RAT operations, e.g., full reuse, load balancing/shifting, coordination, since these require coordination which is not available in Wi-Fi, and since Wi-Fi lacks interference tolerance capability and mainly relies on interference avoidance. However, other dense cellular features, such as cell on/off, link adaptation, HARQ, discovery/IMR, probing, power control/adaptation, etc., can also be used for U-LTE inter-RAT operations.

Network adaptation, or adaptive transmission, has been studied in 3GPP, such as small cell on/off based on existing procedures. However, the main approaches have been reusing existing procedures, such as handover, Scell activation/deactivation, and dual connectivity procedures, to achieve small cell on/off in semi-static time scales. The on/off may be in a couple tens of milliseconds to hundreds of milliseconds. Faster or more dynamic on/off is also desirable, as it offers even higher performance gains and it is potentially necessary for U-LTE support. Thus, new procedures, mainly new Layer 1 (physical layer, or L1) procedures, are disclosed.

Compared with small cell on/off based on legacy procedures (e.g., handover, Scell activation/deactivation), small cell on/off based on the L1 procedure may have its distinct properties, scope, target, and scenarios.

Small cell on/off based on the L1 procedure should not rely on legacy procedures (handover and Scell activation/deactivation) for on/off. In addition, the L1 procedure should limit its standards impacts mainly to the physical layer, and it should not lead to significant impacts on higher layers (MAC, RRC, etc.), as in general the physical layer is more dynamic and flexible than higher layers. However, necessary supports by higher layers should not be precluded.

The L1 procedure should result in reduced transition times compared to on/off based on existing procedures such as handover or Scell activation/deactivation. The new L1 procedure should lead to fast on/off, whereas on/off with the existing procedures falls into the category of semi-static on/off.

According to 3GPP 36.133, if a valid RRM measurement is available, then an activation time of less than 24 ms can be feasible based on existing Scell activation/deactivation. The 24 ms includes 4 ms MAC CE decoding time and at least 4 subframes of DL transmission. In the case of TDD carrier with TDD configuration 0, it takes 20 ms for the UE to receive 4 DL subframes. In FDD cases, it takes only 4 ms for the UE to receive 4 DL subframes, so a transition time of faster than 24 ms can be feasible with the legacy Scell activation procedure.

The L1 procedure should lead to faster transitions (otherwise, the network can just rely on Scell activation/deactivation procedure). Thus, it is desirable to target the transition time to be no longer than the duration of one radio frame (10 ms) in the worst case, and subframe-level transition is desirable and should also be supported.

Different scenarios may mandate different requirements and different designs. Part or all of the following scenarios may be considered for the new L1 procedure: 1) Co-located versus non-co-located, the Scell operating fast on/off may be co-located or non-co-located with the Pcell; 2) inter-band CA versus intra-band CA, the Scell operating fast on/off may be in a different band or the same band as the Pcell, and in the intra-band case, the carriers for the Scell and Pcell may be contiguous or non-contiguous; 3) synchronized versus un-synchronized, the Scell operating fast on/off may be time-synchronized or un-synchronized as the Pcell.

Both the design complexity and applicability of the new L1 procedure should be considered when defining the scenarios. At least the co-located and synchronized scenarios in both inter-band and intra-band should be considered, and un-synchronized scenarios may also be studied. Therefore, synchronized scenarios may be addressed first, and then un-synchronized scenarios may be addressed by further considering time/frequency tracking issues and related UE behavior issues.

Before going to more detailed embodiments for dynamic on/off support, a few basic assumptions need to be made.

1. Transition Time Between on/Off States and the Definition of Transition Time Used:
   A few clarifications need to be made for defining transition time. For example, the on/off states may be defined from an eNB perspective or a UE perspective. Based on how the on/off states are defined, the transition time may be defined accordingly.
   Alt 1: define the transition time between on/off states from a UE perspective (e.g. from a time that UE does not monitor the Scell to the time that UE can receive data).
   Alt 2: define the transition time between on/off states from an eNB perspective (e.g. from the time that the data arrives at the eNB MAC buffer to the time that eNB transmits RS or eNB can transmit data to a UE).
   As generally the UE behaviors (instead of eNB behaviors) are defined in the specifications, it is more meaningful that the transition time between on/off states is defined from a UE perspective. This implies that at least for some downlink subframes the UE needs not monitor any downlink signal of a Scell performing fast on/off.

2. On/Off Granularity, i.e., any Minimum-on-Time (after Transition from Off to on State) and Minimum-Off-Time (after Transition from on to Off State) Restriction:
   The minimum-on-time and minimum-off-time depend on how the on/off states are defined. They are more meaningful if they are defined from a UE perspective to restrict UE behavior. In other words, once the UE transitions from the non-monitoring state to monitoring state, it needs to keep monitoring for at least a number of subframes defined by the minimum-on-time. Likewise the minimum-off-time can be defined. The actual achievable values depend on the detailed solution.

3. Assumptions on Data Availability/Location (e.g., at eNB MAC Buffer):
   To reduce potential impacts on upper layers, it should assumed that data is available at the eNB MAC buffer.

4. Assumptions on CSI Availability:
   It is desirable that CSI is available for reliable link adaptation. The manner in which CSI may be made available depends on RS transmissions and UE monitoring behavior. To reduce overhead and interference caused by RS, periodic transmission of DL RS for CSI measurement may not be desirable, unless the RS is sparse in time domain (i.e. has a low overhead in the time domain). One way to enable periodic transmission of RS by a cell performing on/off is to transmit the RS together with DRS (or the DRS contains RS that can be used for CSI measurement). Otherwise, DL RS may be transmitted aperiodically, such as together with DL data.

5. Assumptions on TA Availability:
   For UEs capable of supporting UL CA, TA for the Scell can be obtained based on existing mechanisms, if decided by the network. It is assumed that TA can be made available when needed.

6. Assumptions on DRX Status (for Example, No DRX Configuration):

To minimize potential impacts on upper layer functions, it is desirable not to introduce any new DRX behavior. In other words, UE may assume that the network will ensure it does not enter the DRX mode if it is configured to perform the L1 procedure. One way to achieve this is to not configure DRX for UEs performing the L1 procedure. Another way may be by coordinating DRX and on/off timing at the eNB. For example, by proper DRX configuration and proper Scell activation/deactivation configuration, the Scell will not enter DRX mode in its activated state if the Scell is intended to perform fast on/off.

7. Assumptions Regarding PDCCH or EPDCCH Reception at UE:

The UE should monitor (E)PDCCH candidates in a subframe in the ON state (ON from the UE perspective), where monitoring (E)PDCCH implies attempting to decode (E)PDCCH according to all monitored DCI formats. The UE can enter the ON state according to network indication, such as L1 indication. Otherwise the UE does not monitor (E)PDCCH. In other words, in this case, the ON/OFF states of the UE correspond to (E)PDCCH monitoring/non-monitoring states, respectively. An alternative embodiment is that the UE always monitors (E)PDCCH from the Scell, regardless of the ON/OFF state of the Scell.

8. Assumptions on the Availability of RRC RRM Measurement (RSRP/RSRQ) at eNB:

With the introduction of DRS and DRS-based RRM measurement, the RRM measurement results should be available at eNB if the eNB configures DRS and associated measurement.

9. Preferred Criteria to Trigger on/Off Transitions:

Preferred criteria to trigger Scell on/off transitions may include packet arrival/completion, load balancing/shifting, and interference coordination, to list a few.

10. How to Enable Time/Frequency Tracking and Automatic Gain Control at Off to on Transition:

The time/frequency tracking is highly dependent on the scenarios (e.g., synchronized or not) for which the L1 procedure is designed. When the time-synchronized scenarios are considered, the time/frequency tracking of Scell can rely on the Pcell and no time needs to be spent on tracking during the off-to-on transition. For the case where un-synchronized or coarse synchronized carrier is assumed, an amount of time should be allowed to achieve time/frequency tracking. The exact number of subframes for initial time/frequency tracking depends on the DRS design.

The delay caused by RF tuning (assuming RF is on) and AGC settling has been studied. From these studies, one may estimate that the delay caused by RF tuning and AGC settling will be at most a couple of OFDM symbol durations. Time/frequency tracking is related to scenarios; AGC settling time may be at most 2 OFDM symbol durations of 140 µs.

Some design embodiments are provided below for the L1 procedure based on fast on/off.

Figure 5:
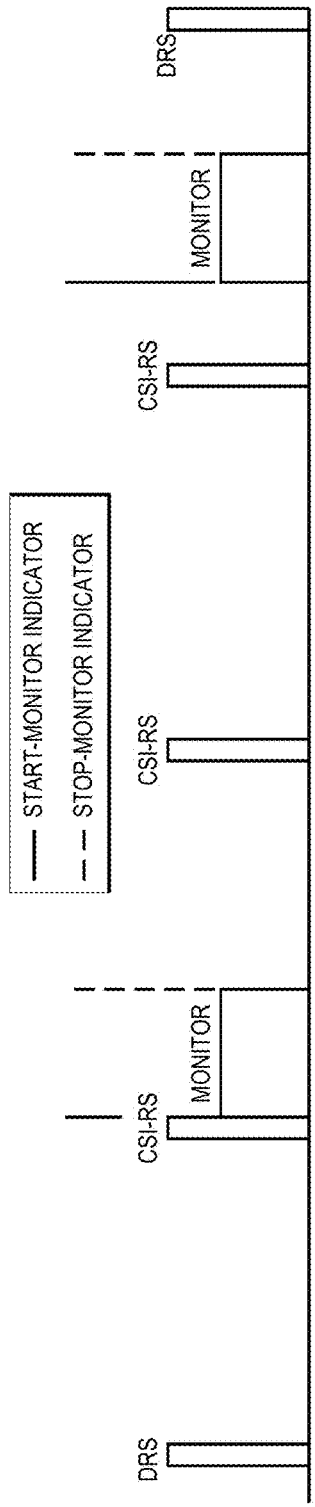
FIG. 5 illustrates communication signaling of an embodiment.

An example of the L1 procedure is illustrated in FIG. 5. The UE does not monitor the activated Scell except for subframes containing DRS or periodic CSI-RS or periodic CRS (whose presence and periodicity are configurable), unless it receives an indicator for starting monitoring of the Scell. After the UE receives the signaling, it starts monitoring for (E)PDCCH and may receive data for a number of subframes. Finally, the UE stops monitoring the Scell after it receives an indicator to stopping monitoring of the Scell.

To support small cell off-to-on transition at any subframe with low UE complexity and high reliability, the Scell off-to-on indicator should be sent from the Pcell which the UE always monitors. For the case of Scell on-to-off transition, some kind of implicit indication may be possible. For example, the stop-monitoring indicator may be implicit based on the absence of (E)PDCCH for a certain amount of time. However, in some cases, it may be simple and beneficial to have a unified solution for off-to-on and on-to-off indication. Therefore, an explicit DCI message for both Scell off-to-on and Scell on-to-off indication may also be used, such as an indication bit. When the indication bit is set for the Scell, then it indicates the Scell is turning on; otherwise the Scell is turning off. A bitmap can be formed and sent from the Pcell to indicate the state transitions of multiple Scells, and the mapping between the bits and the Scells can be predefined in RRC signaling. One more bit can be added for each Scell if needed, such as to indicate the state changes of the Scell in addition to directly indicating the on/off state. This may be needed since, for the same Scell, UEs attached to it may have different states (monitoring or not monitoring). Only transmitting the on/off state of the Scell will force the UEs to start or stop monitoring upon receiving the indicator, but in some cases this is not desired if the network just wants the UEs to maintain their current states. For example, bit 1 is used to indicate if the UEs should keep their current states or update according to bit 2, and bits 3 through N are used to indicate the on/off. Alternatively, the Scell identifier may be carried with the indicator. For example, the eNB may indicate with one or two bits that Scell 1 is turning on, turning off, or UE should keep or flip their current states. Another embodiment is just to indicate if the states need to be flipped or kept without indicating the on/off states. However, this may have the drawback in that if a UE misses one indicator, it may not work correctly thereafter. For example, the eNB may indicate with one bit of whether the UEs should keep or flip their current states. To summarize, various embodiments can be provided to signal the possible states: turning on versus turning off, and flipping the current states versus maintaining the current states. One or more of the states may be indicated.

Considering the scope of the L1 procedure for small cell on/off is mainly in physical layer design, it is better that the Scell on/off indication is transmitted through DCI message via the Pcell, which is assumed always on. In addition, when a small cell configured as a Scell is turning on or off, the cell state information may need to be sent to multiple UEs having this cell in their configured Scell list. Therefore, the Scell on/off state indication may be sent to a group of UEs using a DCI message. DCI Format 1C of the LTE standard may be reused or modified for this purpose. Group RNTI or an RNTI common to all UEs in the cell may be used, such as SI-RNTI or P-RNTI. The DCI may be monitored by the UE on the Pcell on every DL subframe. The DCI may also be combined with an aperiodic CSI request to trigger UE reports of CSI measurements. For example, if the DCI indicates that the cell is on or the UE needs to monitor the cell, then the UE sends an aperiodic CSI report on the Pcell's (or other Scell's) specified resources. The DCI may also be combined with eIMTA dynamic TDD configuration indicator.

An alternative is to use an implicit indicator. In this case, the Pcell does not send any explicit indicator regarding the on/off state. The UE monitors every subframe, and detects if there is RS and/or (E)PDCCH for it on this Scell. There may be cases where RS is detected but no (E)PDCCH for this UE is detected. In this case, the UE can update its measurements (CSI measurements and/or RRM measurements) and the RS can help the UE with time/frequency tracking and AGC. There may be cases where (E)PDCCH for this UE is detected but no RS is detected except for DMRS that is used for demodulation, where the DMRS may be signaled to be quasi-co-located with the RS detected elsewhere on the Scell or a specified DRS. There may be cases where RS is detected and (E)PDCCH for this UE is detected, and the UE can update its measurements (CSI measurements and/or RRM measurements), the RS can help the UE with time/frequency tracking and AGC, and the RS may be used for demodulation of the PDCCH and possibly the data.

For either the explicit indicator or the implicit indicator, the network may further restrict on which subframes the indicator may be sent, thus reducing the UE's monitoring times. The cases with a FDD Pcell and TDD Scell, and FDD Pcell and TDD eIMTA Scell, and TDD Pcell/Scell, etc., may be considered. For example, the turning-on transition may only occur in subframe 0 (and subframe 5), and hence the indicator may be sent only on subframe 9 (and subframe 4). A longer delay between the indicator and the turning-on transition may also be used, such as 2 or 4 subframes. If the subframe after the delay is not a DL subframe, then the turning-on will occur on the first DL subframe after the delay.

It can be seen from the above example that, in addition to DRS, the standards impacts of the L1 procedure mainly includes defining the explicit DCI message to support Scell on/off and the associated UE monitoring behaviors.

Figure 6:
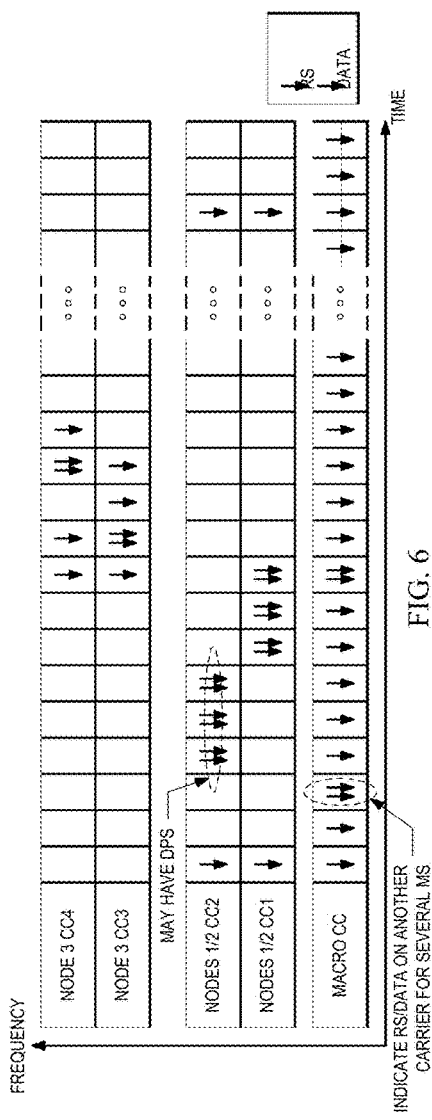
FIG. 6 shows an example of adaptive resource selection and opportunistic transmission/measurements.

FIG. 6 shows an example of adaptive resource selection and opportunistic transmission/measurements. The macro carrier normally acts as the Pcell, and does not turn off. It transmits CRS and other common channels regularly. The UE generally always monitors the macro CC for CRS, common channels, signaling related to other CCs, and possibly data. Besides the macro CC, the UE has discovered a number of cells (e.g., by DRS) and some of them may be configured to the UE as possible transmission points. Node1 and node2 may be small cell operating in licensed spectrum, and each may have more than one CC, e.g., CC1 and CC2. They may be connected via fast backhaul. They may transmit DRS regularly with long duty cycles. They may be turned off in non-DRS bursts unless a measurement/transmission is needed. For example, the macro may indicate that in a next subframe (with delay of 0 subframe, 1 subframe, or more subframes), node 1 and/or node 2 may transmit RS and/or data in CC1/CC2. Then the nodes may be turned on and the UE starts to monitor and feedback CSI reports.

Depending on the channel quality, interference coordination purposes, load balancing/shifting, etc., dynamic point selection (DPS, or DPB for dynamic point blanking) may be performed. Different from DPS used in Rel-11 CoMP, here the RS transmission may be turned off if a cell is not selected, and the RS transmission may be turned on if a cell is selected. The scheduling information may be from the macro or any of the cells, but signaling may be sent from a transmitting cell to indicate how the UE may receive the scheduling information, such as in a subset of the cells in the next few subframes. Similarly, a cell may further indicate the UE to monitor cells on unlicensed spectrum (e.g. node 3 CC3 and node 3 CC4). These cells generally do not use periodic measurements, so aperiodic measurement may be triggered to provide link adaptation capability. Usually the measurement may precede the data transmission on the unlicensed cell, but they may also be transmitted at the same time when the cell is selected, with possibly higher decoding error probability or with conservative data transmissions until the measurement result is obtained by the network.

Figure 7:
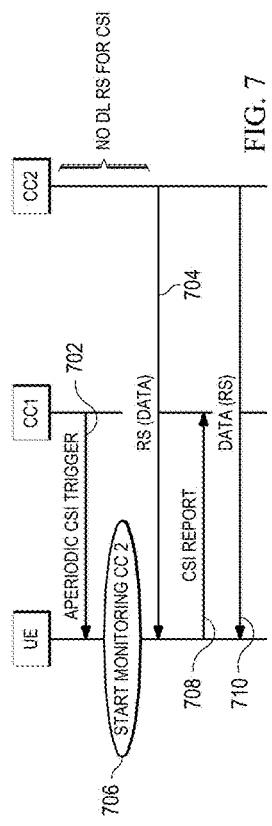
FIG. 7 illustrates an embodiment design of CSI measurement/feedback on demand for link adaptation.

FIG. 7 shows an embodiment design of CSI measurement/feedback on demand for link adaptation. In this figure, CC1 may be a carrier that the UE is monitoring (e.g., CC1 may be Pcell or an activated Scell). CC2 is an opportunistically on/off cell and has fast backhaul with CC1. There may not be DL RS for CSI measurements and reporting sent by CC2 when it is not selected. To support transmission on CC2, CC1 may transmit an aperiodic CSI trigger 702 for CC2. At about the same time, CC2 may start the RS transmission 704 to the UE. Upon receiving the trigger in the RS transmission, the UE starts monitoring transmissions from CC2 706 (and possibly receives data transmissions). An aperiodic CSI report 708 may be generated by the UE and sent to the network (e.g. to the CC1 and CC2). With the CSI report 708, CC2 can perform link adaptation for its transmissions accordingly and, for example, download data 710. Then the operations between UE and CC2 may be similar to existing ones, such as periodic RS for CSI measurements may be transmitted, and periodic CSI reporting may be performed. Alternatively, the UE may rely on RS detection to determine the presence of RS.

The aperiodic CSI trigger may contain more information than the existing one. For example, it may tell the UE at least how long the UE should monitor CC2 (e.g., it may tell the UE to monitor at least 5 subframes, but for UE still receiving data on the $5^{th}$ subframe, the UE can keep monitoring after those 5 subframes). The turning on of CC2 may not be for only one UE. A number of UEs may need to receive the trigger. In this case, group DCI may be used to trigger measurements and reporting by a number of UEs. The trigger may also be used for specifying more than one cell. For example, it may ask a group of UEs to monitor several cells.

Figure 8:
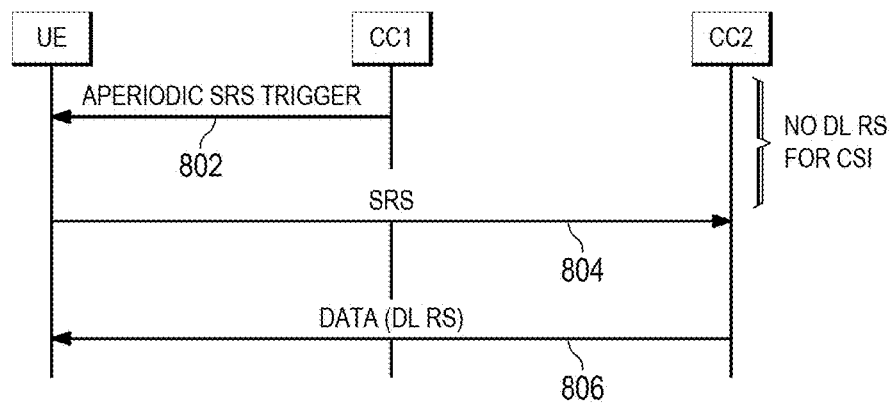
FIG. 8 illustrates another embodiment design of CSI measurement/feedback on demand for link adaptation.

FIG. 8 shows another embodiment design of CSI measurement/feedback on demand for link adaptation. In this case, CC1 transmits an aperiodic SRS (sounding reference signal) trigger 802 to the UE. The UE then sends SRS 804 to CC2 in the specified resource. The SRS may be used by CC2 as a turning-on trigger, and it can also be used for CSI measurements and possibly timing advance for the UE to use (signal back to the UE). Then CC2 starts to transmit data and possibly DL RS 806.

If the SRS transmission uses only one antenna of the UE, for CC2 to perform MIMO transmissions in DL, more transmissions may be triggered (such as by one trigger). However, the interference at the UE may not be known to the network using this method. It may be used in conjunction with other methods that can provide interference measurements to the network, and the network can choose the transmission format based on the SRS and reported interference.

Figure 9:
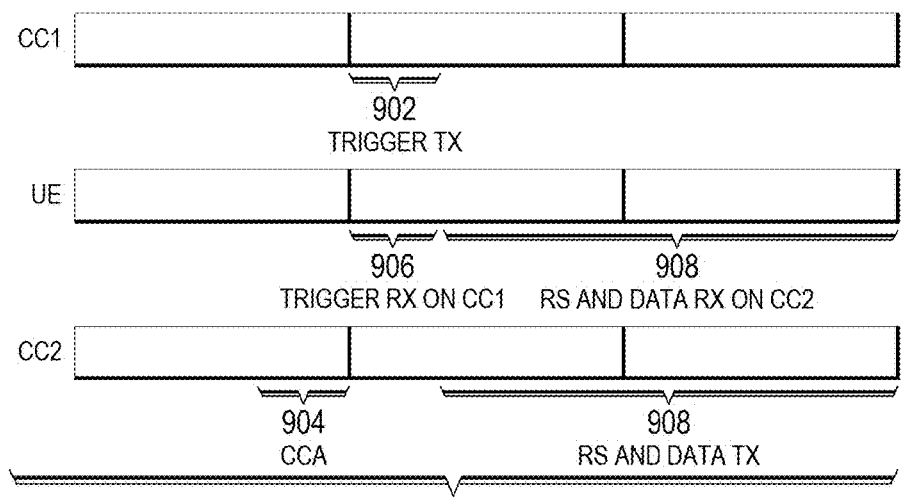
FIG. 9 illustrates an embodiment design of CSI measurement/feedback on demand in U-LTE.

FIG. 9 shows an embodiment design of CSI measurement/feedback on demand for link adaptation, operating in U-LTE. It is assumed that CC1 is a cellular cell that the UE is monitoring, and CC2 is an opportunistically on/off cell operating on unlicensed carrier and has fast backhaul with CC1 (e.g., CC1 and CC2 are collocated). There is generally no DL RS for CSI measurements and reporting sent by CC2 when it is not selected. Besides, CC2 cannot transmit until it senses no transmission on that unlicensed carrier for a period of time; i.e., CC2 has to perform clear channel assessment 904 (CCA) before using the channel.

To support transmission on CC2, first CC2 may perform CCA 904 in the last few OFDM symbols of a subframe. If the channel is clear, then CC1 may transmit an aperiodic CSI trigger 902 for CC2; otherwise CC2 may repeat the CCA for a consecutive number of subframes. Generally, the trigger 902 is transmitted by CC1 in its PDCCH in the subframe following a successful CCA, and then the UE may detect and decode that trigger 906 in at most a few symbol durations. Then starting from symbol x in that subframe which is no earlier than the end of the trigger, CC2 may start RS transmission 908. Upon receiving the trigger, the UE starts monitoring CC2 (and possibly data). An aperiodic CSI report may be generated and sent to the network (e.g. CC1). With the CSI report, CC2 can perform link adaptation for its transmissions accordingly. In an embodiment CC2 may need to reserve the channel after CCA. CC2 may also perform CCA until the first few symbols of the subframe that the trigger is sent, and transmit RS immediately after the CCA. The trigger may be alternatively transmitted in CC1's EPD-CCH, which occupies last symbols of a subframe but normally not the first few symbols. In this case the CCA and the EPDCCH containing the trigger may be done in one subframe. Then the RS/data transmission can only start from in the subframe after the EPDCCH. To make sure that the UE has time to detect and decode EPDCCH and prepare for monitoring CC2, the RS/data transmission should avoid the first few OFDM symbols of that subframe. CSI-RS may be a suitable candidate for the DL RS. Alternatively, if CRS is to be used, it may be transmitted only in the second slot in that subframe.

Figure 10:
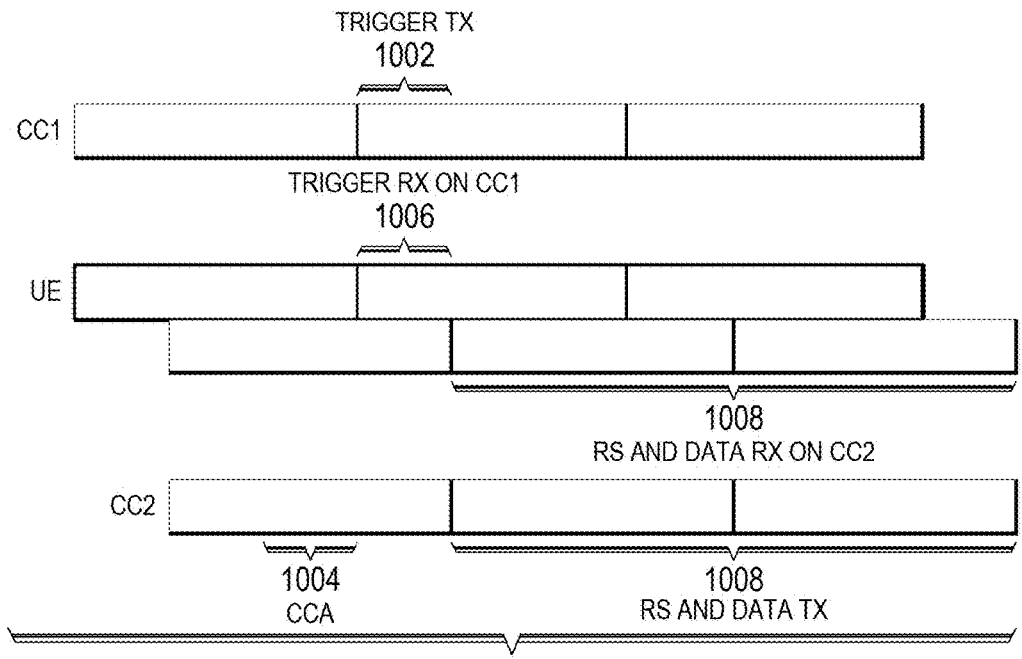
FIG. 10 illustrates another embodiment design of CSI measurement/feedback on demand in U-LTE with shifted subframe boundaries.

Note that the RS and possible data transmission may not occur in the first few symbols of the subframe of CC2. In other words, every time CC2 starts this procedure, a few symbols may be lost. If such opportunistic transmissions occur frequently and each transmission is not long, the overhead may be high. Alternatively, CC2 may be time-shifted from CC1, as shown in FIG. 10. For simplicity, the shift may be a slot, but it can be other durations such as one or more OFDM symbol durations. Then RS and possibly data can be sent in the subframe by CC2 immediately after the trigger is sent. The UE receives the trigger from CC1 (based on CC1 subframe timing), and it starts to buffer the subframe of CC2 immediately after that for RS and possibly data. The licensed carriers may have the same subframe boundaries (subject to allowable timing errors), and the unlicensed carriers use the licensed as reference timing, but with a (possibly common) shift of the subframe boundaries. Therefore, at the cost that the network and UE maintain two timings (though related), the unlicensed subframes can be fully utilized.

FIG. 10 shows an embodiment design of CSI measurement/feedback on demand for link adaptation in U-LTE, based on aperiodic SRS trigger and UL SRS to CC2. Generally the UL transmissions are scheduled by the network, and the time/frequency resource to be used by the UL transmission is decided and specified by the network. However, in the unlicensed spectrum, the UE still needs to sense the channel and then decides if it can transmit or not. At least two alternatives may be adopted to deal with this issue. One is to allow some timing uncertainties in transmitting a scheduled UL, thus allowing the UE to back off a few symbols/slots/subframes before it times out. The other is that both the network node and UE should sense and reserve the channel before the scheduled transmission. These embodiments are described below.

Figure 11:
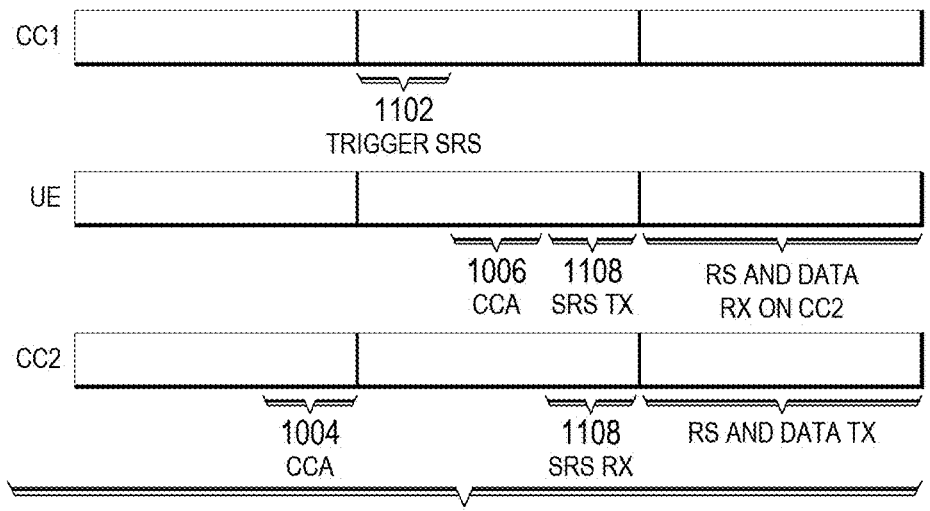
FIG. 11 illustrates another embodiment design of CSI measurement/feedback on demand in U-LTE.

In an embodiment, CC2 performs CCA 1004 at the last few symbols of a subframe, deciding if UL and/or DL transmissions are suitable or not. If yes, then CC1 sends SRS trigger 1002 in PDCCH in the next subframe. The UE then performs CCA upon receiving the SRS trigger 1006, and sends SRS in the last symbol(s) of the subframe (the last part of the subframe may be viewed as UpPTS for SRS transmission). Then data and/or DL RS from CC2 1008 may follow in the next subframe. As shown in FIG. 11, the UE may also treat the SRS trigger 1102 as a signaling requesting it to start monitoring CC2 since the next subframe. In another embodiment, CC2 performs CCA 1104 and sends EPDCCH in a subframe, and the UE performs CCA 1106 and sends SRS 1108 in the next subframe. In another embodiment, CC2's subframe boundaries may be shifted related to CC1's subframe boundaries, for example, by one slot.

In an embodiment, the RTS/CTS signals may also be transmitted similar to Wi-Fi. However, in U-LTE, the RTS/CTS mechanism does not need to be followed exactly. For example, even for the UL transmission, the network node CC2 may send RTS, and the UE may reply with CTS or the UE does not need to reply with CTS (just sending the UL without CTS). The signal contents/waveforms may also be altered from RTS/CTS, for example, the SRS may be viewed as a form of CTS in response to CC2's RTS. The RTS/CTS may also be used for U-LTE to transmit information, for example, they may contain scheduling and transmission information for SRS/CSI. The RTS may also be used to trigger UL transmissions.

In an embodiment, the DL RS may be enhanced to better suit the dynamic on/off schemes. For DRS generally used for RRM measurements, in systems like U-LTE systems, they may not be able to transmit periodically, depending on if an opportunity exists or not. One way to resolve this issue is to use trigger-based DRS transmission, measurement, and/or reporting. In other words, a DRS may be sent only after the eNB seizes a transmission opportunity, and the eNB can notify the UE to perform the measurement. In this case, the network may provide another indicator of whether the UE should also report the RRM measurements for this triggering instance.

Some signals included in the DRS burst may also be used for CSI measurements, tracking, etc. Nevertheless, it may still happen that when a Scell is turning on, only outdated CSI is available. An enhanced RS for CSI measurements may be used. The RS may occur as early as possible with the first subframe after the trigger. The RS may be transmitted in full power. The RS may occupy the entire bandwidth. Proper muting/orthogonalization may be used to improve the RS's SINR, such as PDSCH muting for CRS, zero-power CSI-RS for non-zero-power CSI-RS, cyclic shift for different cells on overlapped REs. One example is the cyclic-shifted enhanced CSI-RS, on the first symbols of the subframe. Such enhanced RS can significantly boost CSI measurement accuracy and tracking performance. With such enhanced RS, the density of the RS in time-domain does not have to be very high to ensure reliable CSI measurements. To allow for interference measurements, IMR may also be configured on the first symbols of a subframe, such as CSI-IMR or cyclic shift based IMR. Such enhanced RS may not need to appear in every data-carrying subframe, but at least for the initial subframe(s) after the turning on they can be transmitted. They can also be periodic after the turning on until the turning off.

Even with the enhanced RS, at the first few subframes after the turning on, no up-to-date or accurate CSI may be available. The network may rely on conservative scheduling and transmissions, such as conservative MCS and transmission schemes (such as open-loop MIMO, transmitter diversity). The MCS and transmission schemes may be updated after more reliable CSI is available, such as closed-loop MIMO or MU-MIMO. The change of transmission modes, if needed, may be indicated in DCI or specified as a fixed delay associated with the CSI availability delay (e.g. 5 ms).

The network nodes on the unlicensed carriers may need to monitor the channel usage regularly, and UEs may be configured for this as well. For these purposes, these cells may not transmit anything on some time/frequency resources. For the cells controlled by the same operator, they may mute at the same time (wideband on all channels, usually aligned with Wi-Fi channels), and no UE should transmit. This may be done periodically. A blank subframe pattern may be used, or a smaller time granularity may be used, such as slots/symbols, or a mixture of these. Existing blanking patterns such as those defined for eICIC may be reused (and the signaling mechanism as well), but instead of an almost blank subframe (ABS), a blank subframe is used. The cells sense in the muting duration, and they may sense transmissions by other U-LTE systems or Wi-Fi systems. The statistics are recorded and used by the network to coordinate resource allocation/avoidance in U-LTE systems and to access the interactions with Wi-Fi systems.

Thus, to support intra-RAT coordination among U-LTE systems, the transmission should contain sufficient information for a system to determine which system/RAT is transmitting, which may be done by attempting to detect and decode the preambles of Wi-Fi transmissions. If the transmission is not Wi-Fi (i.e., no Wi-Fi preamble is detected), then the system may know if it is another U-LTE system by examining the waveforms or exchanging information with other systems over backhaul. In addition, a subset of UEs may be configured to sense on the interference measurement resources (IMRs) designed and configured for these purposes. Different from Rel-11 IMRs, these IMRs occupy the full bandwidth of a channel for inter-RAT sensing (but for intra-RAT sensing, with proper coordination, IMR not necessarily occupying wideband as defined now may be used, but the interference on the IMR may be reported separately from CSI reporting). CSI-IMR occupying the entire $9^{th}$ and $10^{th}$ symbols may be used for measurements, and/or measurements on specified blanking subframes may also be used. The IMRs may or may not be associated with any CSI processes, and the measurement may be similar to RSSI defined in Rel-11 or Rel-12.

With the sensing statistics, the network can estimate long-term (at least seconds) traffic loads and channel usage on unlicensed carriers. The network can then opportunistically avoid certain crowded channels and choose more favorable channels. The network may also intentionally avoid using some channels even if those channels are less crowded; instead, via spectrum sensing, Wi-Fi APs may move to those channels. A possible result is Wi-Fi uses a few channels and U-LTE uses other channels. This seems desirable since the U-LTE operations can be efficient without constantly concerning the random access made by Wi-Fi, and UL transmissions can be supported by U-LTE, i.e., there may not be a need for CCA before each transmission. Wi-Fi can also work efficiently with co-existence issues with dense cellular. The LTE system still monitors the entire bandwidth of the unlicensed spectrum and may adjust its occupancy of the channels based on relative loads and channel usages on all the channels. The LTE system may predict possible equilibrium states of the channel usages and find a desirable one for both LTE and Wi-Fi, and steer RATs and traffic to the desired equilibrium state.

In an embodiment, the HARQ is implemented across more than one carrier. For example, a first transmission results in detection/decoding error, and the data is to be retransmitted. If the retransmission has to occur in the carrier, it may be delayed indefinitely depending on the channel sensing results. Thus, it may be useful to perform the retransmission on a different, available carrier, such as a licensed carrier with more reliability. This is different from existing mechanisms. For UL HARQ, it needs to be changed from synchronous to asynchronous, and include the HARQ number in the scheduling information. For DL HARQ, the UE needs to be signaled with necessary information to combine the transmissions from possibly different carriers. From a UE capability perspective, the total HARQ process number need not be larger and may be kept the same for each carrier. Additional information can be added so that the transmissions associated with one HARQ process are associated with the same information (e.g., an index), and that information may be added into the scheduling DCI. There may also be a semi-statically defined mapping by RRC signaling, down-selecting candidate carriers for a HARQ process, thus reducing the signaling overhead for DCI.

Figure 12:
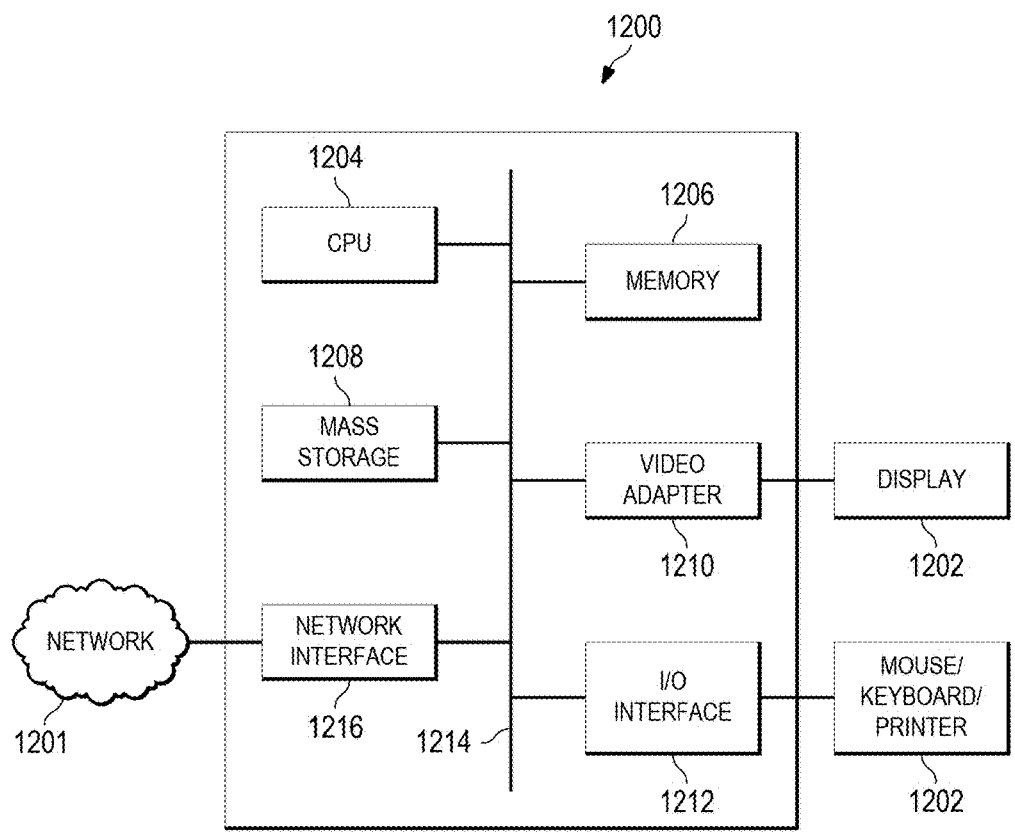
FIG. 12 illustrates a computing platform that may be used for implementing, for example, the devices and methods described herein, in accordance with an embodiment.

FIG. 12 is a block diagram of a processing system 1200 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system may comprise a processing unit equipped with one or more input/output devices 1202, such as a speaker, microphone, mouse, touchscreen, keypad, keyboard, printer, display, and the like. The processing unit may include a central processing unit (CPU) 1204, memory 1206, a mass storage device 1208, a video adapter 1210, and an I/O interface 1212 connected to a bus 1214.

The bus 1214 may be one or more of any type of several bus architectures including a memory bus or memory controller, a peripheral bus, video bus, or the like. The CPU 1204 may comprise any type of electronic data processor. The memory 1206 may comprise any type of non-transitory system memory such as static random access memory (SRAM), dynamic random access memory (DRAM), synchronous DRAM (SDRAM), read-only memory (ROM), a combination thereof, or the like. In an embodiment, the memory 1206 may include ROM for use at boot-up, and DRAM for program and data storage for use while executing programs.

The mass storage device 1208 may comprise any type of non-transitory storage device configured to store data, programs, and other information and to make the data, programs, and other information accessible via the bus. The mass storage device 1208 may comprise, for example, one or more of a solid state drive, hard disk drive, a magnetic disk drive, an optical disk drive, or the like.

The video adapter 1210 and the I/O interface 1212 provide interfaces to couple external input and output devices to the processing unit. As illustrated, examples of input and output devices include the display coupled to the video adapter 1210 and the mouse/keyboard/printer coupled to the I/O interface 1212. Other devices may be coupled to the processing system 1200, and additional or fewer interface devices may be utilized. For example, a serial interface such as Universal Serial Bus (USB) (not shown) may be used to provide an interface for a printer.

The processing system 1200 also includes one or more network interfaces 1216, which may comprise wired links, such as an Ethernet cable or the like, and/or wireless links to access nodes or different networks. The network interface 1216 allows the processing system 1200 to communicate with remote units via the networks. For example, the network interface 1216 may provide wireless communication via one or more transmitters/transmit antennas and one or more receivers/receive antennas. In an embodiment, the processing system 1200 is coupled to a local-area network or a wide-area network 1201 for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication method comprising:
   providing a first communications channel using a first communications controller, wherein the first communications controller controls and communicates with a second communications controller;
   signaling, by the first communications controller, a user equipment (UE) with a first higher layer message in the first communications channel, the first higher layer message including information regarding an activation/deactivation of operations of a subset of a plurality of communications carriers associated with the second communications controller;
   coordinating, by the first communications controller, a transmission opportunity by the second communications controller, the transmission opportunity associated with a communications carrier of the second communications controller activated for the UE;
   sending a bitmap in a physical layer signaling from the first communications controller to the UE indicating the transmission opportunity associated with the communications carrier of the second communications controller activated for the UE, wherein each bit in the bitmap is associated with one of the communications carriers associated with the second communications controller; and
   sending a trigger command on the first communications channel to the UE commanding the UE to communicate using a second communications channel on the communications carrier activated for the UE, the second communications channel indicated by the trigger command and carrying a downlink reference signal, the trigger command associated with the transmission opportunity.

2. The communication method of claim 1, wherein the DL reference signal is a discovery reference signal (DRS).

3. The communication method of claim 1, wherein the DL reference signal is an enhanced RS which is transmitted at a beginning of the transmission opportunity every time.

4. The communication method of claim 1, wherein the DL reference signal is an enhanced RS which is transmitted only at a beginning of the transmission opportunity.

5. The communication method of claim 1, wherein the first communications controller comprises a cell site.

6. The communication method of claim 1, wherein the second communications controller comprises a cell site, a femtocell, a picocell, a microcell or a WiFi network.

7. The communication method of claim 1, wherein the first communications controller and the second communications controller are communicatively connected by at least one backhaul line.

8. The communication method of claim 1, wherein the trigger command is aperiodic.

9. The communication method of claim 1, wherein the second communications controller is configured to send a second DL reference signal in response to the trigger command and the first communications controller is configured to receive a channel status indicator from the UE in response to the second DL reference signal.

10. The communication method of claim 1, wherein the trigger command is provided in a CSI request.

11. The communication method of claim 10, wherein the CSI request is associated with a resource for measurement in a DRS.

12. The communication method of claim 1, wherein the trigger command is provided in an SRS trigger.

13. The communication method of claim 1, wherein the trigger command includes a command instructing the second communications controller when to turn the second communications channel off.

14. The communication method of claim 1, further comprising sending an indicator to the UE when the second communications channel will be turned off.

15. The communication method of claim 1, wherein the transmission opportunity of the second communications controller is transmitted in a DCI message to the UE.

16. The communication method of claim 1, wherein the transmission opportunity of the second communications controller is transmitted in a DCI message to a group of UEs including the UE.

17. A first communications controller comprising:
   a non-transitory memory storage comprising instructions; and
   one or more processors in communication with the memory, wherein the one or more processors execute the instructions for:
     controlling and communicating with a second communications controller;
     providing a first communications channel;
     signaling a user equipment (UE) with a first higher layer message in the first communications channel, the first higher layer message including information regarding an activation/deactivation of operations of a subset of a plurality of communications carriers associated with the second communications controller;
     coordinating a transmission opportunity by the second communications controller, the transmission opportunity associated with a communications carrier of the second communications controller activated for the UE;
     sending a bitmap in a physical layer signaling from the first communications controller to the UE indicating the transmission opportunity associated with the communications carrier of the second communications controller activated for the UE, wherein each bit in the bitmap is associated with one of the communications carriers associated with the second communications controller; and
     sending a trigger command on the first communications channel to the UE commanding the UE to communicate using a second communications channel on the communications carrier activated for the UE, the second communications channel indicated by the trigger command and carrying a downlink (DL) reference signal, the trigger command associated with the transmission opportunity.

18. The first communications controller of claim 17, wherein the DL reference signal is a discovery reference signal (DRS).

19. The first communications controller of claim 17, wherein the DL reference signal is an enhanced RS which is transmitted at a beginning of the transmission opportunity every time.

20. The first communications controller of claim 17, wherein the DL reference signal is an enhanced RS which is transmitted only at a beginning of the transmission opportunity.

21. The first communications controller of claim 17, wherein the first communications controller comprises a cell site.

22. The first communications controller of claim 17, wherein the second communications controller comprises a cell site, a femtocell, a picocell, a microcell or a WiFi network.

23. The first communications controller of claim 17, wherein the first communications controller and the second communications controller are communicatively connected by at least one backhaul line.

24. The first communications controller of claim 17, wherein the trigger command is aperiodic.

25. The first communications controller of claim 17, wherein the second communications controller is configured to send a second DL reference signal in response to the trigger command, and the one or more processors further execute the instructions for receiving a channel status indicator from the UE in response to the second DL reference signal.

26. The first communications controller of claim 17, wherein the trigger command is provided in a CSI request.

27. The first communications controller of claim 26, wherein the CSI request is associated with a resource for measurement in a DRS.

28. The first communications controller of claim 17, wherein the trigger command is provided in an SRS trigger.

29. The first communications controller of claim 17, wherein the trigger command includes a command instructing the second communications controller when to turn the second communications channel off.

30. The first communications controller of claim 17, wherein the one or more processors further execute the instructions for sending an indicator to the UE when the second communications channel will be turned off.

31. The first communications controller of claim 17, wherein the transmission opportunity of the second communications controller is transmitted in a DCI message to the UE.

32. The first communications controller of claim 17, wherein the transmission opportunity of the second communications controller is transmitted in a DCI message to a group of UEs including the UE.

* * * * *